No. 783,455. PATENTED FEB. 28, 1905.
F. L. McGAHAN.
FLUID FUEL BURNER.
APPLICATION FILED FEB. 10, 1904.
2 SHEETS—SHEET 1.
Fig. 1.
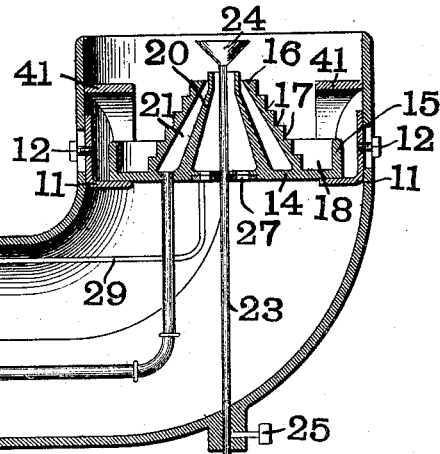
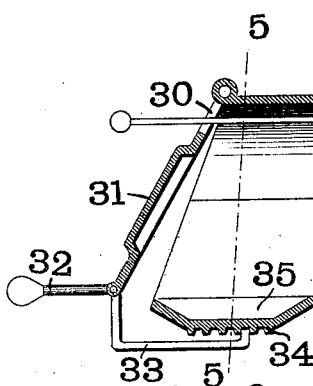
Fig. 2.
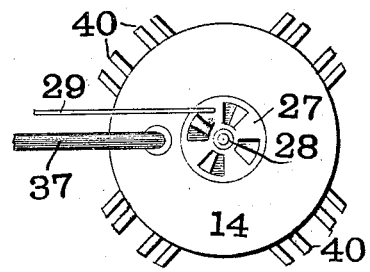
Fig. 3.
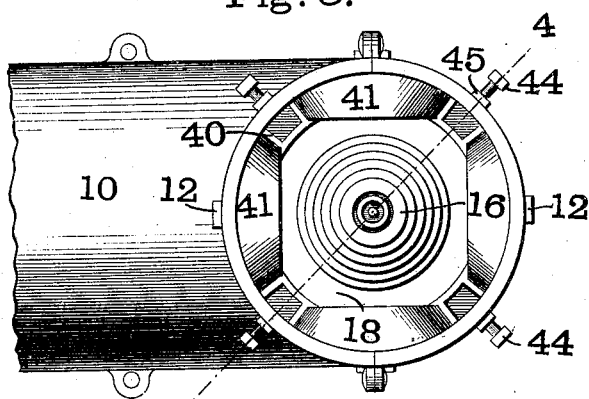
Fig. 5.
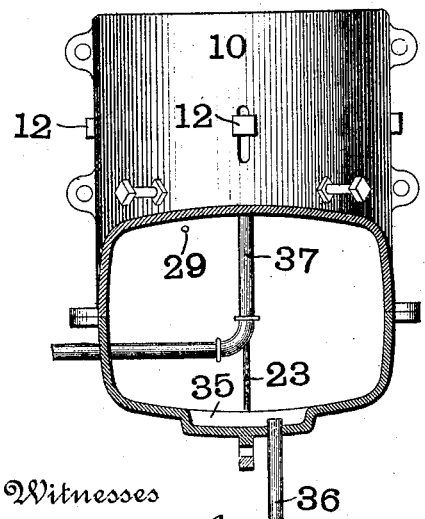
Fig. 4.
Witnesses
W. A. Alexander
Fred Henke.
Inventor
F. L. McGahan
By Attorneys No. 783,455. PATENTED FEB. 28, 1905.
F. L. McGAHAN.
FLUID FUEL BURNER.
APPLICATION FILED FEB. 10, 1904.
2 SHEETS—SHEET 2.
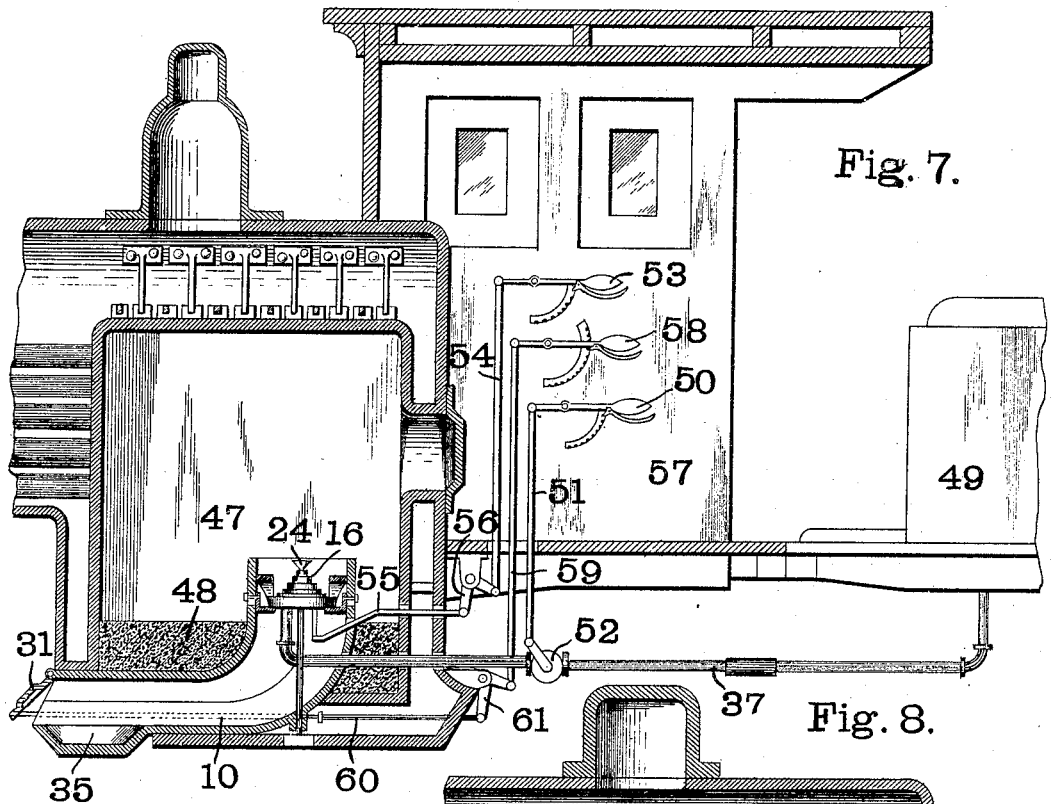
Fig. 7.
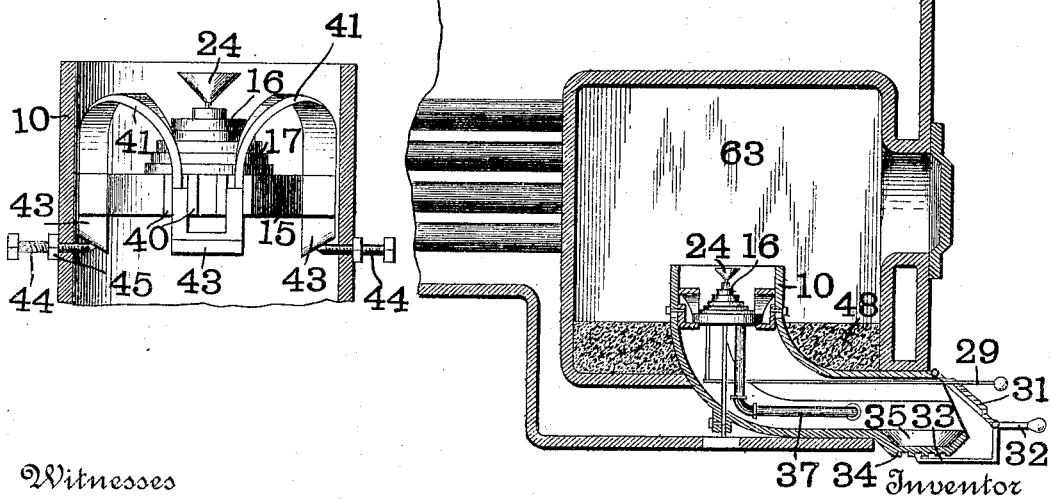
Fig. 6.
Fig. 8.
Witnesses
W. A. Alexander
Fred Henke
Inventor
F. L. McGahan
By Attorneys No. 783,455.

Patented February 28, 1905.

UNITED STATES PATENT OFFICE.

FREDERICK L. McGAHAN, OF ST. LOUIS, MISSOURI.

FLUID-FUEL BURNER.

SPECIFICATION forming part of Letters Patent No. 783,455, dated February 28, 1905.

Application filed February 10, 1904. Serial No. 192,882.

*To all whom it may concern:*

Be it known that I, FREDERICK L. MCGAHAN, a citizen of the United States, residing at the city of St. Louis, in the State of Missouri, have invented a certain new and useful Fluid-Fuel Burner, of which the following is such a full, clear, and exact description as will enable any one skilled in the art to which it appertains to make and use the same, reference being had to the accompanying drawings, forming part of this specification.

My invention relates to new and useful improvements in burners for oil or other similar fuels, and also to improvements in the casing in which the burner is supported, whereby the air admitted to the combustion-chamber is easily and accurately controlled and is supplied to the burner at such points as to obtain the best results in complete combustion and intense heat.

In the drawings, in which like characters of reference refer to similar parts in the several views, Figure 1 is a vertical longitudinal section through an apparatus embodying my invention. Fig. 2 is a bottom plan view of the burner, the casing being removed. Fig. 3 is a top plan view of the burner and casing shown in Fig. 1, the front end of the casing being broken away and the central air-deflector omitted. Fig. 4 is a vertical section on the line 4 4 of Fig. 3. Fig. 5 is a vertical section on the line 5 5 of Fig. 1. Fig. 6 is a side elevation of the burner and the air-deflectors, the surrounding portion of the casing being shown in section; and Figs. 7 and 8 are views showing in longitudinal vertical section the application of my invention to a locomotive-boiler and to a stationary boiler, respectively.

Referring now to Fig. 1, 10 represents a casing which is preferably made in two parts suitably bolted together. The horizontal portion of this casing is in the form of a slightly-flattened cylinder and the upward extension thereof is circular in cross-section. The burner itself is adjustably supported in the upward extension of the casing 10 by means of angle-irons 11. These angle-irons are four in number and are held in position so as to be adjustable vertically by means of the bolts 12, passing through longitudinal slots in the casing 10. The base 14 of the burner is circular and is provided at its periphery with an annular flange 15. Concentrically disposed upon the base 14 within the flange 15 is a hollow truncated cone 16, in the outer surface of which are formed a number of circumferential grooves 17. Between the cone 16 and the flange 15 is formed the catch-basin 18. Situated concentrically within the truncated cone 16 is a second hollow truncated cone 20, an upward extension of which projects through the opening in the top of the hollow truncated cone 16. Between the two cones 16 and 20 is a fuel-chamber 21. A rod 23 passes through a central perforation in the base 14. The upper end of this rod 23 extends through the opening at the top of the cone 20 and is provided with a flaring deflector 24. The lower end of the rod 23 passes through a perforation in the casing 10 and is made adjustable by means of a set-screw 25. Formed concentrically in the under side of the base 14 is an annular groove in which is a shutter 27, adapted to rotate about a boss 28 surrounding the perforation, through which the rod 23 passes. The openings in the shutter 27 correspond with similar openings in the base 14 to regulate the admission of the air into the hollow cone 20, as hereinafter described. The shutter 27 is adjusted by means of a suitable rod 29, the end of which passes through a slot 30 in the door 31, with which the end of the horizontal extension of the casing 10 is provided. This door 31 is hinged to the upper side of the casing 10 and is provided at its lower side with a pivotally-operating handle 32. This handle 32 is provided with a bent-forward extension 33 in the form of a pawl, which is adapted to engage with a number of teeth 34, formed on the under side of the casing 10. The handle 32 being heavier than the extension 33 the device will operate to hold the door 31 in any desired position. This end of the casing 10 is also provided with a depression 35, from which leads a waste-pipe 36, Fig. 5. The inner end of this waste-pipe projects a slight distance above the bottom of the depression 35.

A supply-pipe 37 for the oil or other fluid passes through the side of the horizontal extension in the casing 10 and leads through the base of the burner 14 into the fuel-chamber 20. The base of the burner 14 is also provided, as best shown in Figs. 2, 3, 4, and 6, with a number of sets of radially-projecting lugs 40. These lugs 40 are adapted to receive between them, as best shown in Figs. 3, 4, and 6, the downwardly-extending ends of a number of air-deflectors 41. The downwardly-extending ends of these air-deflectors 41 rest upon the upturned ends of U-shaped pieces 43, which are in turn supported and made adjustable by means of set-screws 44, passing through the sides of the casing 10. Nuts 45 serve to lock these set-screws in position. The inner ends of the set-screws 44 are beveled and are adapted to engage with the beveled under sides of the U-shaped pieces 43.

Fig. 7 shows one way of adapting my invention for use with the fire-box 47 of a locomotive. In this instance the door of the casing 10 is represented as situated at the rear side of the fire-box 47. After the casing 10 has been inserted in the fire-box 47 the fire-box is preferably partially filled with a refractory material 48, such as a mixture of fire-clay and asbestos fiber, which is put in in a plastic state and which afterward hardens to form an air-tight union between the casing 10 and the fire-box 47, so that all the air which enters the fire-box 47 must do so through the casing 10. The admission of the oil to the burner from the tender 49 is controlled by means of a handle 50, situated in the cab 57 and suitably connected by means of a rod 51 for operating the valve 52 in the pipe 37. The adjustment of the shutter 27 is accomplished by means of a handle 53, also situated in the cab 57 and suitably connected by rods 54 and 55 and the bent lever 56 for operating the same. The position of the door 31 is also regulated by means of a handle 58 in the cab 27 and suitably connected by means of rods 59 and 60 and the bent lever 61 for operating the same.

Fig. 8 shows my invention adapted for use in the fire-box 63 of a stationary boiler. In this instance, as in the apparatus shown and described in connection with Fig. 7, the casing 10 is embedded in the refractory material 48, so that all the air which enters the fire-box 63 must enter the same through the casing 10, its passage therethrough being controlled as described in connection with Fig. 1.

In the operation of my invention a suitable fuel, such as oil, is supplied by means of the pipe 37 to the fuel-chamber 21. This oil will overflow through the opening at the top of said fuel-chamber 21 into the grooves 17 and will thence flow into the catch-basin 18. A little oil is then lighted in the depression 35, which serves as a lighting-pan. The flame as it escapes through the casing 10 around the burner will light the oil at the top of the burner. As the burner is thus heated the oil in the fuel-chamber 21 will escape through the opening at the top of said chamber in a gaseous state. At this point it mixes with the air supplied through the interior air-passage formed by the hollow truncated cone 20 and also with the air supplied through the air-passage between the burner and the casing 10 and deflected inwardly by the deflectors 41. When the mixed fuel is lighted at this point, perfect combustion will take place. The quantity of air admitted to the burner and its direction are adjusted by means of the door 31, shutter 27, and air-deflectors 24 and 41, and the position of the burner itself in the casing 10 is regulated by means of the bolts 12, so that the best results in combustion are produced.

Having fully described my invention, what I claim as new, and desire to secure by Letters Patent of the United States, is—

1. A fluid-fuel burner provided with a central air-passage, means for regulating the flow of air through said passage, a fuel-storage chamber surrounding said air-passage, a downwardly-inclined burning-surface surrounding said fuel-chamber, and a passage for conducting the fuel from said fuel-chamber to said burning-surface.

2. The combination with a casing, of a burner provided with a central air-passage and separated in said casing to leave an air-passage between said casing and burner, a fuel-chamber surrounding said central air-passage, an inclined burning-surface surrounding said fuel-chamber, a passage leading from said fuel-chamber to said burning-surface, and an adjustable deflector for directing the air in said passage between said burner and said casing against said burning-surface.

3. The combination with a casing, of a burner supported within said casing to leave an air-passage between said parts and having a central air-passage and an inclined burning, surface deflectors for deflecting inwardly the air passing between said casing and burner, and a deflector for deflecting outwardly the air passing from said central air-passage.

4. The combination with a casing, of a burner supported within said casing to leave an air-passage between said parts and having a central air-passage and an inclined burning-surface, deflectors for deflecting inwardly the air passing between said casing and burner, and an adjustable deflector for deflecting outwardly the air passing from said central air-passage.

5. The combination with a casing, of a burner supported within said casing to leave an air-passage between said parts and having a central air-passage and an inclined burning-surface, adjustable deflectors for deflecting inwardly the air passing between said burner and casing, and an adjustable deflector for deflecting outwardly the air passing through said central air-passage.

6. The combination with a casing, of an adjustable burner supported within said casing to leave an air-passage between said parts and having a central air-passage and an inclined burning-surface, adjustable deflectors for deflecting inwardly the air passing between said burner and casing, and an adjustable deflector for deflecting outwardly the air passing from said central air-passage.

7. The combination with a casing, of a burner supported within said casing to leave an air-passage between said parts and having a central air-passage and an inclined burning-surface, deflectors for deflecting inwardly the air passing between said casing and burner, a deflector for deflecting outwardly the air passing through said central air-passage, and means for regulating the flow of air from said central air-passage.

8. The combination with a casing, of a burner supported in said casing and provided with radial arms, deflectors having their ends between said arms, U-shaped members supporting the ends of said deflectors, and means for adjusting said U-shaped members.

9. The combination with a casing, of a burner supported in said casing and provided with radial arms, deflectors having their ends between said arms, U-shaped members with inclined faces supporting the ends of said deflectors, and set-screws bearing against said inclined faces to adjust said members.

10. The combination with a casing forming an air-passage and having a covered horizontal part and a vertical part, of a burner supported in the vertical part of said casing and having an inclined burning-surface, and an oil-pan in the horizontal part of said casing.

11. The combination with a casing having a horizontal part and a vertical part, of a burner supported in the vertical part of said casing and having an inclined burning-surface, an oil-pan in the horizontal part of said casing, and an adjustable door for the horizontal part of said casing.

12. The combination with a fire-box, of a casing forming an air-passage and extending laterally into said fire-box, an oil-burner supported at the inner end of said casing, an air-tight filling of refractory material between said casing and fire-box, and means for supplying oil to said burner.

13. The combination with a fire-box, of a casing extending into said fire-box and having a horizontal part and a vertical part, a burner supported in the vertical part of said casing and having an inclined burning-surface, an oil-pan in the horizontal part of said casing, an air-tight filling of refractory material between said casing and fire-box, and means for supplying oil to said burner.

14. The combination with a fire-box, of a casing extending into said fire-box and having a horizontal part and a vertical part, a burner having a central air-passage and an inclined burning-surface supported in the vertical part of said casing, deflectors for deflecting the air against said burning-surface, an oil-pan in the horizontal part of said casing, an air-tight filling of refractory material between said casing and fire-box, and means for supplying oil to said burner.

In testimony whereof I have hereunto set my hand and affixed my seal in the presence of two subscribing witnesses.

FRED. L. McGAHAN. [L. S.]

Witnesses:
 W. A. ALEXANDER,
 JAMES H. BRYSON.